C. COLAHAN.
APPARATUS FOR PREPARING UNRETTED FIBER STALKS FOR DECORTICATION AND CONVERSION INTO FIBER.
APPLICATION FILED DEC. 3, 1909.
994,124.
Patented June 6, 1911.
4 SHEETS—SHEET 3.
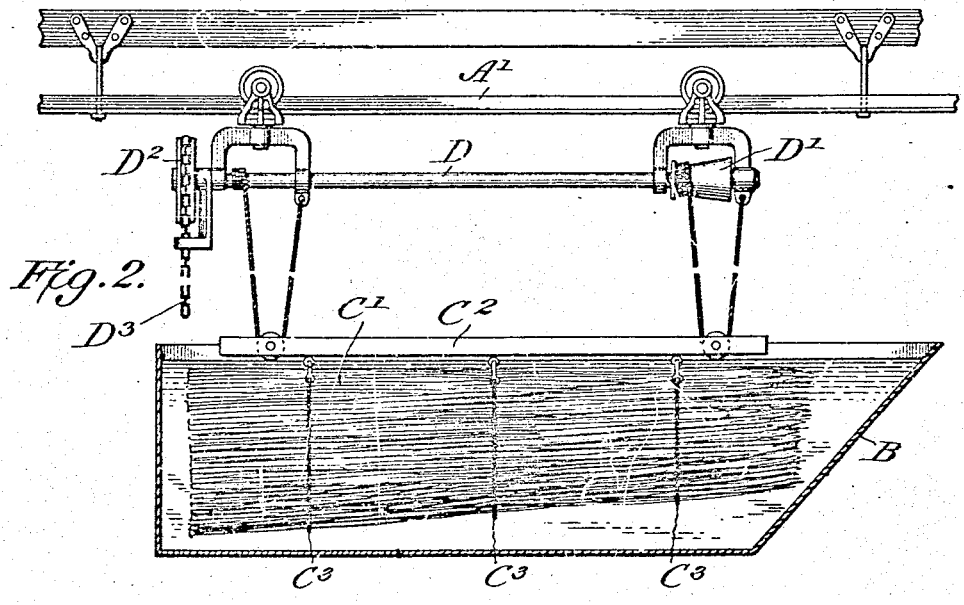
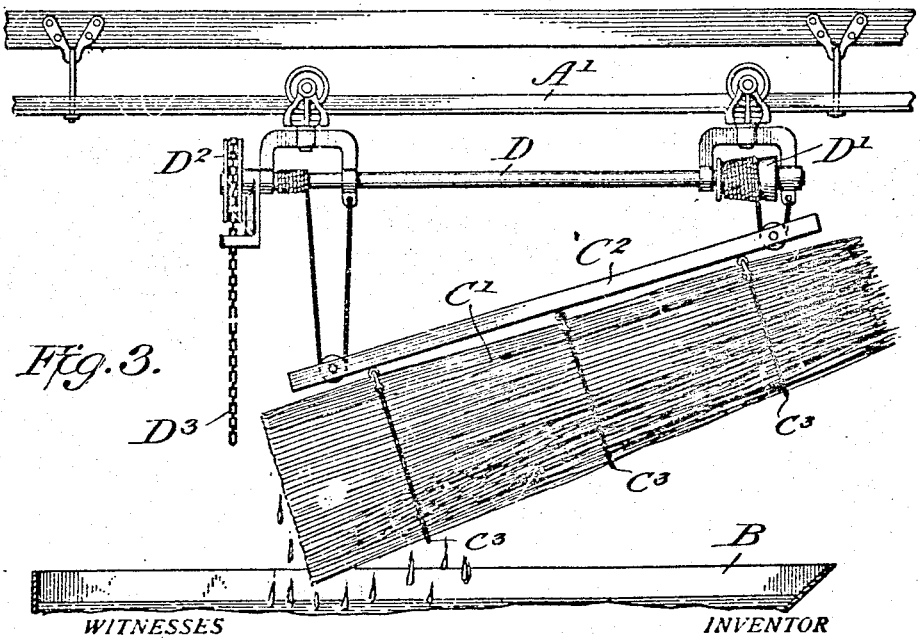
WITNESSES
INVENTOR

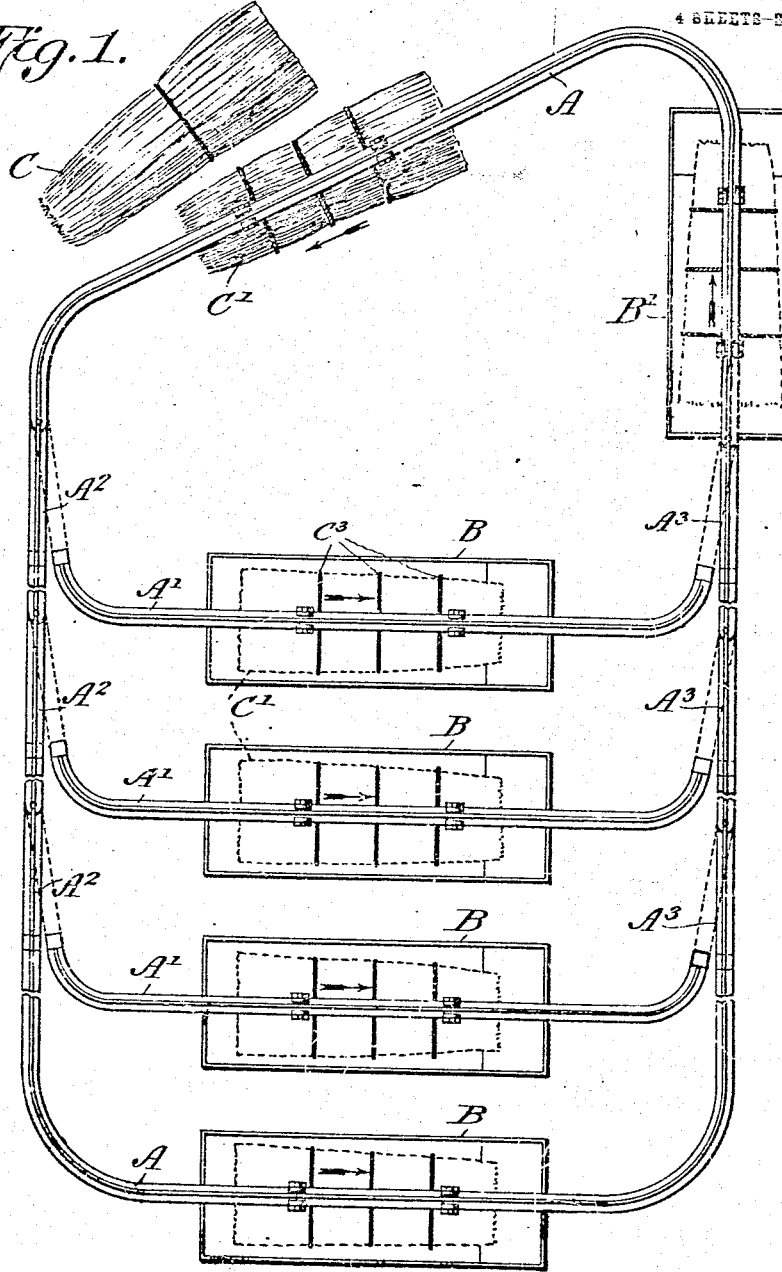

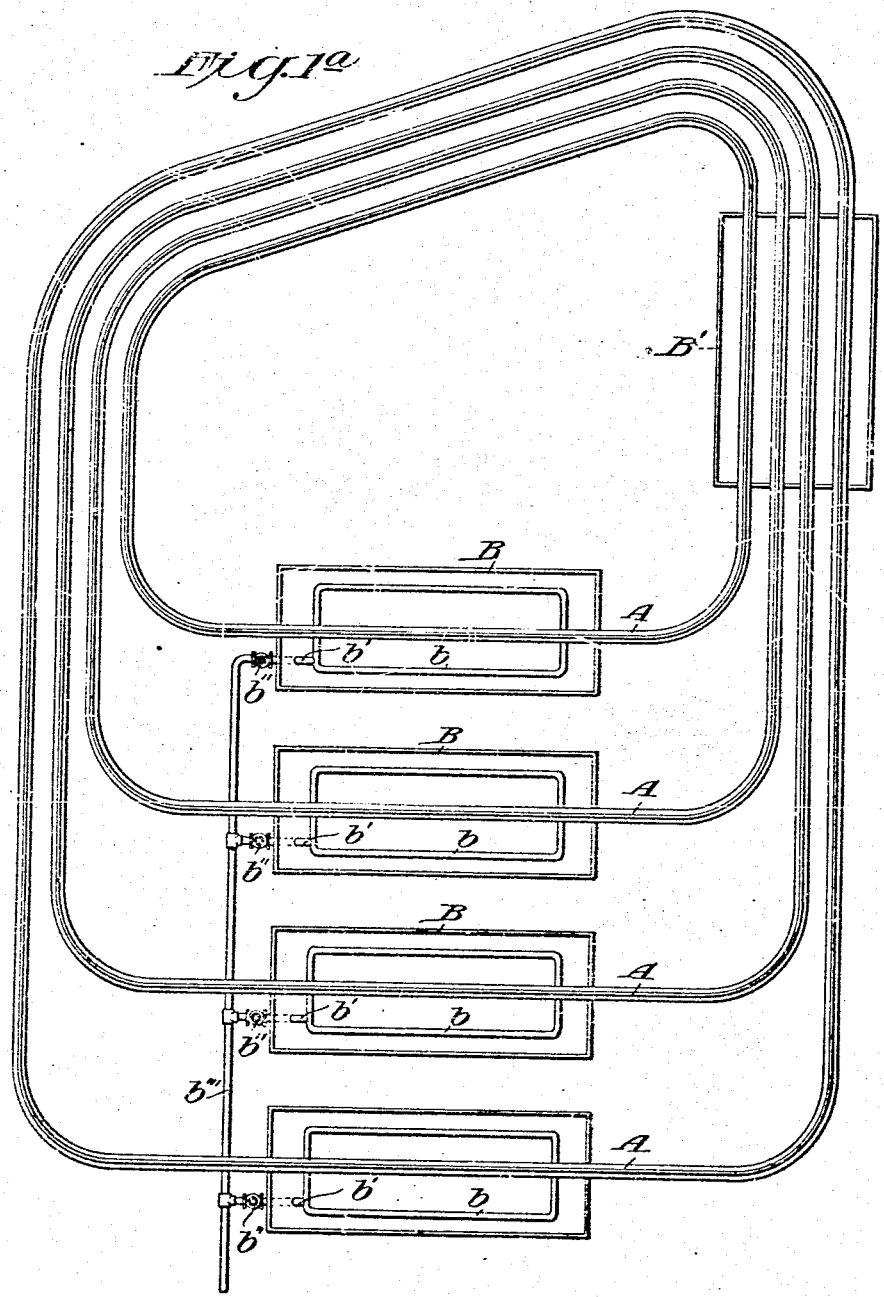

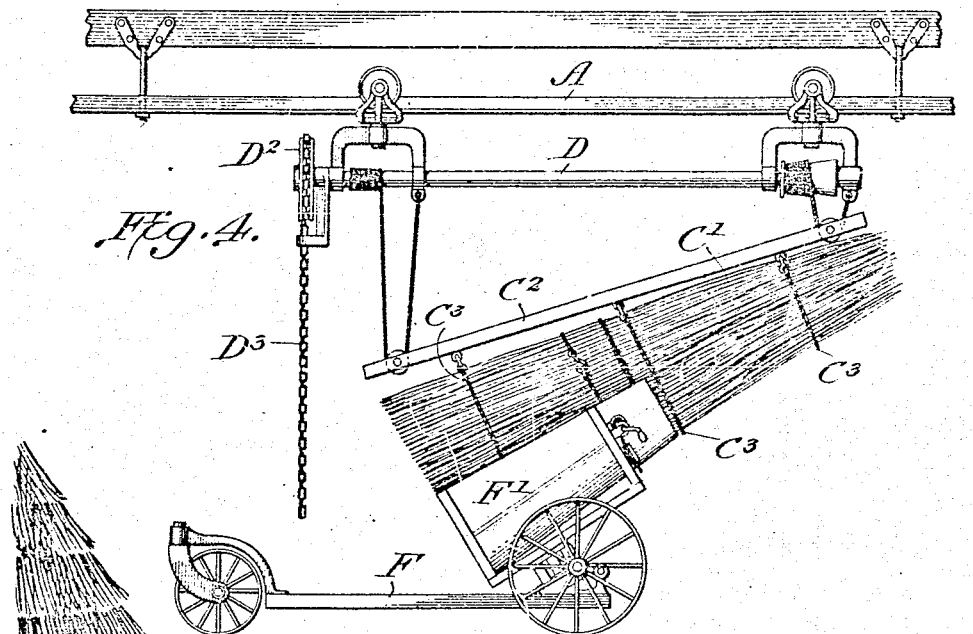
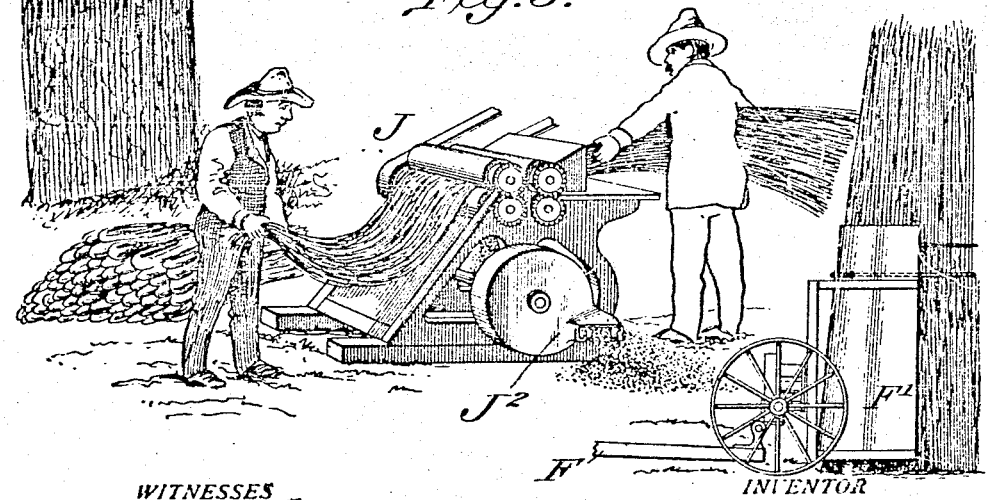

UNITED STATES PATENT OFFICE.

CHARLES COLAHAN, OF LEXINGTON, KENTUCKY.

APPARATUS FOR PREPARING UNRETTED FIBER STALKS FOR DECORTICATION AND CONVERSION INTO FIBER.

994,124.

Specification of Letters Patent.

Patented June 6, 1911.

Application filed December 3, 1909. Serial No. 531,266.

*To all whom it may concern:*

Be it known that I, CHARLES COLAHAN, a citizen of the United States, and resident of Lexington, county of Fayette, and State of Kentucky, have invented certain new and useful Improvements in the Apparatus for Preparing Unretted Fiber Stalks for Decortication and Conversion into Fiber, of which the following is a specification, reference being had to the accompanying drawings, forming a part thereof.

This invention relates to the process or method of preparing unretted fiber stalks for decortication and conversion into fiber, and has for its object the provision of means whereby the entire work embracing the successive functions necessary to complete the desired result, is simultaneously accomplished in one continuous operation, as hereafter shown and described.

A further feature of this invention resides in the arrangement of tanks and carrier system, whereby each predetermined quantity or bundle of hemp stalks is intermittently conveyed thereto, and moved continuously and controlled separately and independently in the process of treating, and rinsing, for placing in the drying field shocks.

Further objects of the invention will hereinafter appear, such as the carrying device provided with the raising and lowering means to place the bundle horizontally in the retting tank and raise it obliquely therefrom to drain, and the moving it forward successively, as illustrated.

It is a well known fact, that in the art, what is technically termed retting, to insure the removal of the gums that bind the fiber together and to the stalks, as commonly practiced, is brought about by spreading the stalks upon the ground where exposure of several months impairs the fiber's natural strength, discolors the fiber, and also produces incipient decay that is injurious to the fiber, while many of the fiber stalks are lost by being broken and scattered, or tangled, and much of it is injured in the repeated handling and moving. This unavoidably causes great loss of fiber, and the cost of the labor, being done entirely by field hands, often absorbs the value of the crop, and prejudices the production of this great staple crop that grows perfectly in all parts of the United States. In providing the means herein described, the fiber stalks are always kept parallel and straight at all times, through my process of retting, shocking, and placing in the curing stack, and through decortication and preparation for spinners' use, thus insuring a greater per cent. of line fiber.

By the use of my process I am enabled to produce a uniform fiber of superior and unvarying quality at less cost than has heretofore been done, and as it preserves all the fiber, I obtain a greater yield that more than compensates for the cost of the work. This operation is continuous, and the stalks are subjected for so brief a time to the retting liquid as not to be saturated with moisture, and soon after become dry for breaking, or placing in stacks, and will preserve their bright color and perfect condition for any desired period.

In the drawings, Figure 1 is a plan view of the continuous complete bundle moving elevated carrier track system, for conveying the stalks to and from the tanks, in the process of treating and rinsing. Fig. 1$^A$ is a plan view of the same showing the carrier track for each tank separate, and single and continuous, thus dispensing with the switches. This figure also shows the conveying steam heating pipes located at the bottom of the treating tanks. Fig. 2 is an elevation of one of the steam heated retting tanks, with its inclined drain receiving end, the moving carrier and the raising and lowering means in connection with the bundle submerged therein. Fig. 3, is an elevation of the same, showing the means applied to raise the bundle out of the tank to an inclined position insuring the draining of the surplus moisture therefrom after treatment. Fig. 4 is an elevation of the moving carrier in connection with the field shocking truck receiving the bundle after treatment for depositing said bundle in the field to dry. Fig. 5 shows the decorticating machine breaking and cleaning the fiber stalks after drying.

In the drawings A is the main elevated carrier track, A' its cross carrier tracks connecting therewith by the inlet switches A$^2$, and outlet switches A$^3$.

B B are the retting or treating tanks containing the steam heated solvent, of which there are several; $b$ is the steam heating pipe at the bottom of the tanks, $b'$ the connecting pipe with its valve $b''$ admitting the steam from the boiler pipe $b'''$; B' the rinsing and cooling tank.

C is the bundle of stalks ready to be attached to the carrier by means of cables. C' represents the same attached thereto, in the manner shown in Fig. 3, in which a carrier bar $C^2$ provided with bundle securing bands $C^3$ is used for holding and releasing the bundle but it may be attached to the bundle in any well known manner and the carrier bar $C^2$ dispensed with.

D is the raising and lowering operating carrier shaft. D' the enlarged front windlass thereon to secure the raising of the front end of the bundle faster than the rear end to elevate it to draining position, this operating shaft being revolved by a single actuating means in raising and lowering the bundle.

$D^2$ is the operating raising and lowering chain pulley secured to the revolving shaft D. $D^3$ is its actuating chain operated by hand in a well known manner.

F is the shocking truck and F' its pivoted bundle carrier.

J is the decorticator receiving the unbroken bundle of stalks which pass out as clean fiber, and $J^2$ the pneumatic broken stalk, or hurd, discharging drum operating in connection therewith.

The bundles are attached to the carrier by means of cables operated by the revolving windlass shaft D that is supported in downhanging swivel arms, moving on an endless track by gravity, the track being provided with inlet and outlet switches to and from the treating tanks, or, the track for each tank may be separate and single and continuous thus dispensing with the switches. The bundle is lowered to a horizontal position into the solvent contained in the open retting tank B while suspended from the carrier, and when treated, is raised therefrom by the revolving shaft D, which is provided with means to cause a more rapid and further upward movement of the bundle at one end than the other end, to place the same in position to permit the draining of the surplus moisture back into the tank. The bundle is then forwarded without being detached from its carrier to the rinsing tank B', into which it is lowered, and raised out, quickly, and discharged from its carrier upon the shocking truck, as shown in Fig. 4, on which it is conveyed to the field to dry, without further handling. When dry it may be subjected to decortication or placed in stacks.

In operation, the bundles of hemp stalks are secured by means of cables to the revolving raising and lowering shafts of successive carriers mounted on elevated tracks, and moved forward and lowered into each tank, as may be desired, and subjected to twenty minutes treatment, which thoroughly degums and softens the epidermis and fiber, permanently dissolving the mucinous matter. The bundle is then raised therefrom to an angular position by the revolving shaft of its carrier, and moved slightly forward to permit the draining back of the surplus moisture and dissolved gums that are received by the inclined end of the tank. A succeeding bundle is ready at hand and lowered therein. The treated bundle remains but an instant in angular draining position, when it is rapidly moved forward and immersed into the rinsing and cooling tank, one of which tanks is sufficient, the bundle being quickly raised therefrom to draining position, and discharged from its carrier onto the shocking truck as shown.

The arrangement of the treating tanks in series as shown, is important, as it enables one operator to maintain the series in constant operation as a whole, without regard to the required time of treatment of any one of the bundles in its tank, which varies with different conditions of the bundles of hemp stalks, some bundles requiring longer treatment than others. When shocked these stalks soon become dry, ready for decorticating or stacking, and the fiber produced therefrom is soft, bright in color, clean, and free from extrinsic matter.

By my improved process and apparatus, the entire manual labor involved in operating the system of the separate successive tanks, requires only two operators, who can treat as much hemp per day as ten men handle in the old way.

Having thus described my invention, what I claim and desire to secure by Letters Patent is;

1. A system for treating fibrous stalks which consists of a series of treating tanks placed adjacent each other, a plurality of substantially parallel carrier tracks passing respectively over said treating tanks, bundle carriers movable on said tracks, and provided with means for raising and lowering the bundles into said tanks.

2. A system of treating fibrous stalks which consists in a series of treating tanks placed adjacent each other, a plurality of carrier tracks passing respectively over said treating tanks, a rinsing tank, said carrier tracks passing over said rinsing tank, bundle carriers movable on said tracks and provided with means for raising and lowering the bundles into said tanks.

3. In an apparatus for rapidly treating bundles of unretted fibrous stalks, a series of independent open treating tanks, means to heat the contents of said tanks, combined with a series of elevated tracks positioned respectively over said tanks, and a plurality of bundle carriers movable on said tracks having revolving raising and lowering shafts and bundles supporting cables for controlling and moving the bundles forward in the operations of treating, draining, rinsing and discharging, substantially as shown and described.

4. In an apparatus for rapidly treating bundles of fibrous stalks, a series of independent open treating tanks, means to heat contents of said tanks, combined with a series of elevated tracks positioned respectively over said tanks, and a plurality of bundle carriers movable on said tracks and having revoluble raising and lowering shafts provided with bundle securing cables and means for raising one end of the bundle higher than the other end to place the same angularly in draining position substantially as shown.

5. In an apparatus for rapidly treating bundles of fibrous stalks a series of independent open retting tanks in simultaneous operation combined with a series of elevated tracks positioned respectively over said tanks and a plurality of bundle carriers mounted thereon and movable in a forward direction, said carriers having means for lowering the bundle horizontally into the tank and raising it therefrom to an angular draining position substantially as shown.

6. In an apparatus for rapidly treating bundles of fibrous stalks a series of independent open treating tanks in simultaneous operation, combined with a series of elevated tracks positioned respectively over said tanks and a plurality of bundle carriers mounted thereon, movable in a forward direction, having bundle raising and lowering shafts provided with cable attachments that retain the bundle continuously in the operation of treating, rinsing and discharging the same to the field track substantially as shown and described.

CHAS. COLAHAN.

Witnesses:
M. H. COLAHAN,
WALLER B. HUNT.